United States Patent Office 3,301,290
Patented Jan. 31, 1967

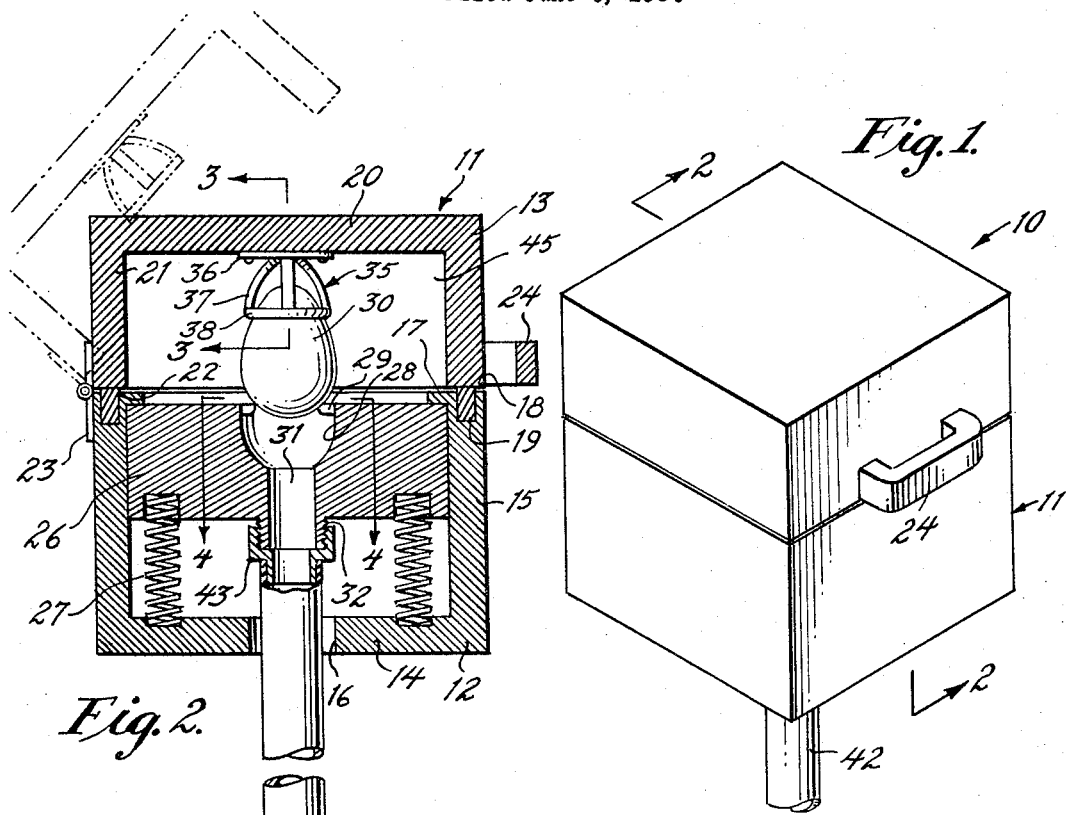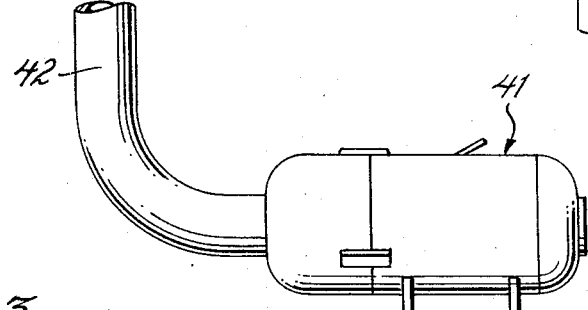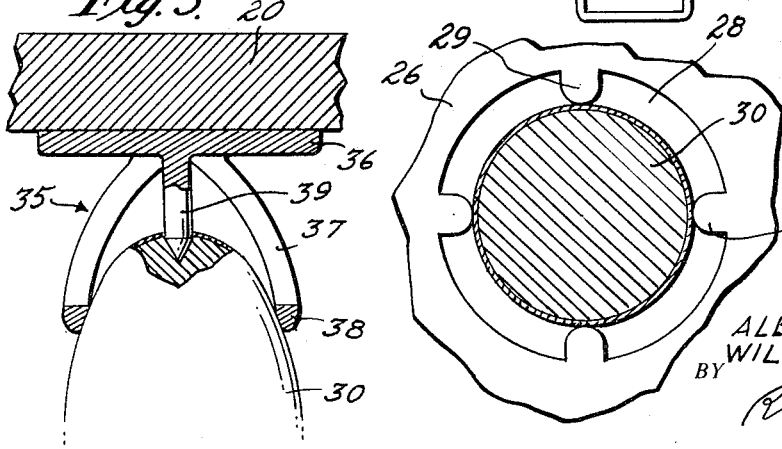
INVENTORS.
ALBERT SCALELLA
WILLIAM R. KILROY
BY Robert K. Youtie
ATTORNEY.

3,301,290
EGG-SHELLING DEVICE
Albert Scalella, 156 Greenhill Road, King of Prussia, Pa. 19406, and William R. Kilroy, 310 E. Cambria St., Philadelphia, Pa. 19134
Filed June 5, 1964, Ser. No. 372,778
6 Claims. (Cl. 146—2)

This invention relates to apparatus for removing the shell of a hard-boiled egg, generally called shelling of an egg.

While there have in the past been proposed various devices for shelling of hard-boiled eggs, such devices have been relatively complex in construction, difficult to operate, and have not found general acceptance.

Accordingly, it is an important object of the present invention to provide an egg-shelling device which overcomes the above-mentioned difficulties, is extremely simple in construction and operation, durable and reliable throughout a long useful life, and adapted to be economically manufactured for sale at a reasonable price.

It is a more particular object of the present invention to provide a unique and highly improved egg-shelling device having the advantageous characteristics mentioned in the preceding paragraph, wherein it is only necessary to load the egg in the device and operate an electric switch to effect complete shelling of the egg and simultaneous disposal of the removed eggshell.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a top perspective view showing an egg-shelling device of the present invention in its closed condition;

FIGURE 2 is a sectional elevational view taken generally along the line 2—2 of FIGURE 1, and illustrating the egg-shelling device in phantom in an open position;

FIGURE 3 is a partial sectional elevational view taken generally along the line 3—3 of FIGURE 2; and FIGURE 4 is a partial sectional view taken generally along the line 4—4 of FIGURE 2.

Referring now more particularly to the drawings, and specifically to FIGURES 1 and 2 thereof, the egg sheller of the present invention is there generally designated 10 and comprises a housing 11 having hollow lower and upper sections 12 and 13.

The housing 11 may be of generally boxlike configuration, the lower section 12 including a bottom wall 14 and an upstanding side wall 15 extending peripherally about the bottom wall. The bottom wall 14 may have a central thru opening 16, and an inturned flange 17, or other suitable stop means may be provided internally of the side wall 15 adjacent to its upper edge 18. Seated in and extending about the upper edge 18 of the peripheral side wall 15 may be suitable sealing means 19, such as a magnetic sealing strip, for a purpose appearing presently. The sealing strip 19 may project slightly above the upper side-wall edge 18.

The upper housing section 13 includes a top wall 20 and a peripherally extending, depending side wall 21 having its lower edge 22 disposed in edge-to-edge relation with the upper edge 18 of lower-section side wall 15, in the solid-line position shown in FIGURE 2. Hinge means 23 may connect the side walls 15 and 21 for relative swinging movement of the sections 12 and 13, as by opening movement of the upper section 13 to the phantom position shown in FIGURE 2. Suitable handle means 24 may be provided on the upper-section side wall 21, externally thereof remote from the hinge means 23, for effecting the above-described opening-and-closing swinging movement of upper section 13. In the closed condition, shown in solid lines in FIGURE 2, the lower edge 22 of upper-section side wall 21 is in closed sealing relation with the upper edge 18 of lower-section side wall 15, as by the sealing strip or gasket 19. Further, this sealing relation is effectively self-sustaining by magnetic action of the sealing gasket.

Arranged conformably within the lower section 12 for sliding up-and-down movement therein is a carrier body 26 resiliently and yieldably supported on its underside by compression springs 27 interposed between the bottom housing wall 14 and the carrier body.

Thus, the carrier body 26 is in the nature of a piston slidable in the peripheral side wall 15 of lower housing section 12 and resiliently urged upward therein. The normal, uppermost limiting position of carrier body 26 is with its upper surface engaging the lugs or stop means 17. Centrally of the carrier body 26 there is formed in the upper surface thereof a cavity or recess 28 facing upward toward the upper housing section 13. At spaced locations about the upper edge of recess 28 are provided studs or supports 29 projecting generally horizontally into the recess. The recess 28 and circumferentially spaced, inwardly projecting studs 29 combine to define a seat for supporting an egg 30 at spaced regions thereof. A fluid-outlet passageway 31 opens downwardly from the recess 28 into a nipple 32 depending from the underside of carrier 26 toward housing opening 16. The egg 30 is therefore supported in spaced relation with respect to the recess 28 directly over the outlet passageway 31.

On the under- or inner side of housing top wall 20 is an eggshell cracker generally designated 35. The cracker 35 includes a mounting plate 36 securely fastened to the top wall 20 and a plurality of diverging arms 67 depending from the mounting plate. A generally annular guide member or ring 38 is secured to the ends of arms 37 and movable into holding engagement over the upper end of an egg 30 supported on seat 28, 29. Depending from the mounting plate 36 spacedly between the arms 37 is a pointed pin or impaling member 39, see FIGURE 3 for cracking engagement with the shell of egg 30.

A source of vacuum or suction is generally designated 41 and is illustrated as being a tank-type vacuum cleaner, but any suitable vacuum source may be employed. Extending from the vacuum source 41 is a conduit or hose 42 which passes upward spacedly through the opening 16 in the bottom housing wall 14 and is connected by a coupling 43 to the nipple 32 for fluid communication through the outlet passageway 31 with the recess 28.

From the foregoing it will now be understood that the lower housing section 12 and its received carrier 26 may be considered as a lower part, and the upper housing section or part 13 combines with the lower part to define of the space therebetween a chamber 45 which is hermetically sealed when the parts are closed. Further, the egg seat 28, 29 of the lower part 12, 26 faces upwardly, directly below the eggshell cracker 35 of the upper part 13.

In operation, it is only necessary to open the upper housing section 13, as shown in dot-and-dash outline, and place an egg on the seat 28, 29. Upon closure of the upper housing section 13, the guide ring or holder 38 engages over the upper end of the egg 30 and the impaling pin 39 engages through the eggshell to crack the latter. Eggs of different sizes are accommodated by the resilient mounting of carrier 26. More specifically, relatively, large eggs cause the carrier 26 to be depressed against their mounting springs 27, so that the egg remains undamaged.

It is then only necessary to apply suction through conduit 42, passageway 31 and recess 28 to the interior of chamber 45, as by operation of vacuum means 41. This serves to suck the shell away from the egg and draw the shell toward the vacuum source. The housing section 12 may then be raised and the shelled egg removed.

From the foregoing, it is seen that the present invention provides an egg-shelling device which fully accomplishes its intended objects and is otherwise well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. An egg-shelling device comprising an openable chamber, a seat in said chamber for supporting an egg at spaced regions thereof, said chamber having an outlet communicating with said seat, a shell cracker in said chamber for cracking the shell of an egg on said seat, and suction means communicating through said outlet for withdrawing the cracked shell from said chamber, said chamber comprising complementary lower and upper parts relatively movable into and out of closed relation, said seat being mounted in upwardly facing relation in said lower part, and said cracker being carried by said upper part for shell-cracking engagement upon closure of said chamber.

2. An egg-shelling device according to claim 1, said seat being resiliently mounted for yielding movement under shell-cracking engagement, to accommodate different-size eggs.

3. An egg-shelling device comprising a seat for supporting a hard-boiled egg at spaced regions thereof, an openable sealed housing for enclosing said seat with an egg thereon, there being a fluid outlet communicating through said seat with the interior of said housing, a shell cracker in said housing for cracking the shell of an egg on said seat, and suction means communicating through said outlet for withdrawing the cracked shell from said housing, said housing comprising a pair of complementary lower and upper sections relatively movable into and out of closed hermetically sealed relation, said seat being resiliently supported in said lower section, and said cracker being carried by said upper section.

4. An egg-shelling device comprising a lower housing section, an upper housing section movable into and out of hermetically sealed closed relation with said lower housing section, a carrier body vertically slidable in said lower housing section and combining with said housing sections to define therein a sealed chamber over said body when said housing sections are closed, an egg seat on the upper side of said body, a fluid-outlet passageway communicating from said seat through said body, resilient means urging said body upwardly, a shell cracker on said upper housing section for cracking engagement with an egg on said seat, and suction means communicating through said outlet passageway for withdrawing cracked eggshells.

5. An egg-shelling device according to claim 4, said seat being defined by an upwardly facing recess, and a plurality of spaced support projecting into said recess for supporting an egg.

6. An egg-shelling device according to claim 5, said cracker comprising a holding member for conforming engagement over an egg, and an impaling member for piercing engagement with the eggshell.

References Cited by the Examiner
UNITED STATES PATENTS

| | | | |
|---|---|---|---|
| 1,491,908 | 4/1924 | Greig | 146—2 |
| 2,445,490 | 7/1948 | Meade | 146—2 |
| 2,575,608 | 11/1951 | Williams | 146—2 |
| 3,207,198 | 9/1965 | Beeson et al. | 146—2 X |

ANDREW R. JUHASZ, *Primary Examiner.*

W. GRAYDON ABERCROMBIE, *Examiner.*